Figures 1, 2:
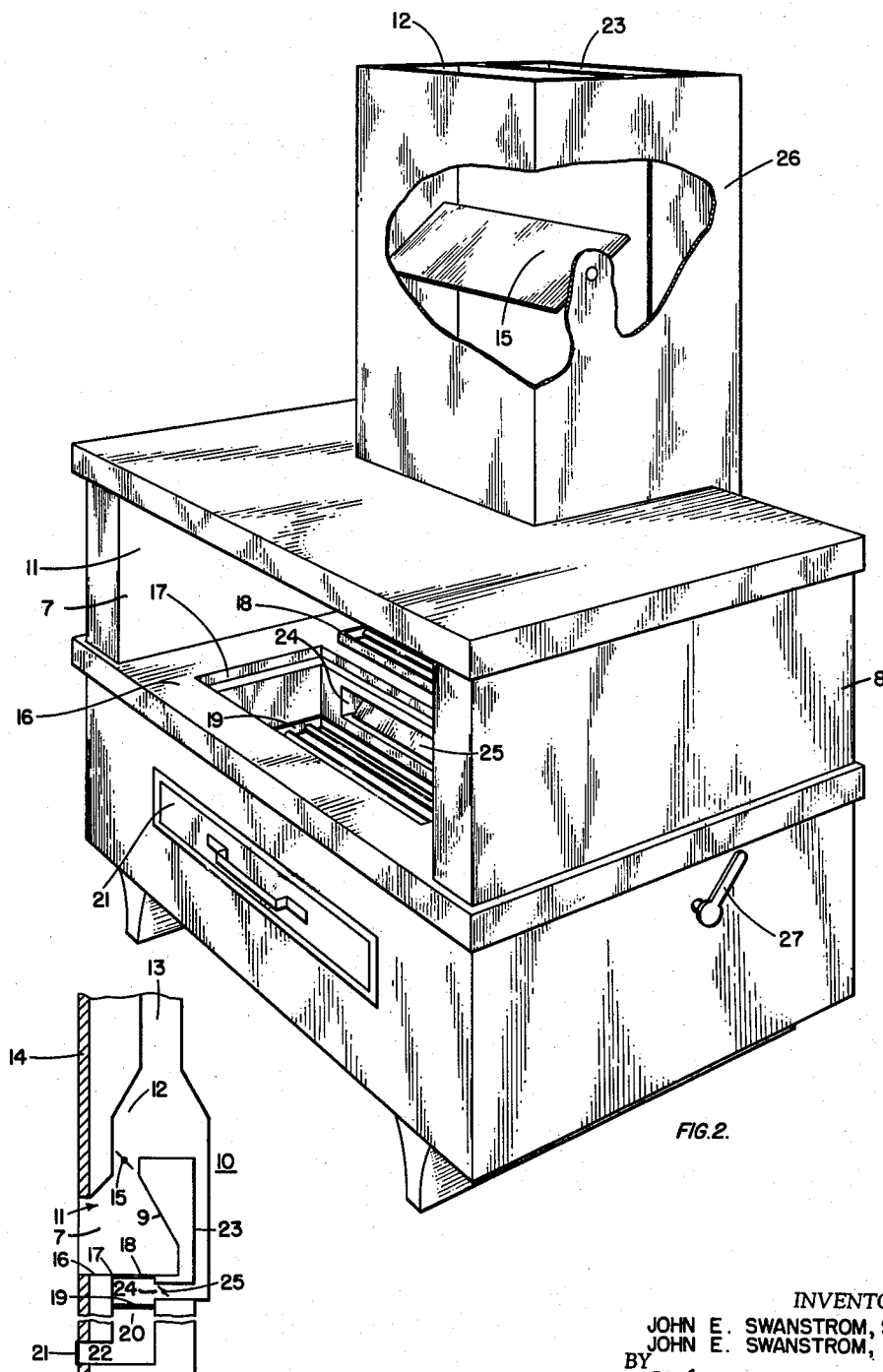

March 23, 1965  J. E. SWANSTROM, SR., ETAL  3,174,473
COMBINED FIREPLACE AND BARBECUE GRILL
Filed Oct. 22, 1962

INVENTORS
JOHN E. SWANSTROM, SR.
JOHN E. SWANSTROM, JR.
BY
Schroeder & Siegfried
ATTORNEYS

United States Patent Office 3,174,473
Patented Mar. 23, 1965

3,174,473
COMBINED FIREPLACE AND BARBECUE GRILL
John E. Swanstrom, Sr., 2700 Greysolon Road, Duluth, Minn., and John E. Swanstrom, Jr., Duluth, Minn.; said John E. Swanstrom, Jr., assignor to said John E. Swanstrom, Sr.
Filed Oct. 22, 1962, Ser. No. 232,053
4 Claims. (Cl. 126—4)

This invention relates to a fireplace and more particularly to a fireplace combined with a barbecue grill.

It is common in most fireplaces to provide means for collecting the ashes below the hearth of the fireplace and for providing a main flue extending from the fireplace with a damper for controlling the air flow through the fire and up the chimney. Various attempts have been made to use different grill arrangements within a fireplace for cooking food, but this generally results in the food being contaminated by the ash from the burning fuel unless the food is covered. Furthermore, if an attempt is made to control the burning rate of the fuel by operating the damper, then the cooking fumes and smoke from grilling or barbecuing are allowed to enter the room, thereby making the process undesirable.

By using an additional grate placed inside a chamber below an opening in the hearth of the fireplace, fuel for barbecuing or grilling may be ignited and by using a second flue or auxiliary flue which communicates with the chamber between the two grates, a means is provided for drawing off the smoke, from the burning fuel and the droppings from the food which is cooking, thereby reducing the contamination of the food which is being cooked. To further control the cooking and burning process of the fuel simultaneously a second damper is placed in the second or auxiliary flue so that the amount of air drawn off the fire through the auxiliary flue may be controlled while at the same time, the main flue may be used to aid in the cooking process as well as the slower burning of the fuel. The present invention contemplates providing a barbecue grill or pit in a chamber beneath the regular fireplace so that the fireplace may serve a dual purpose, that is, both for providing heat and for cooking of food over an open flame. Thus it will be seen that the second or auxiliary flue will provide a draft to draw off the smoke fumes and cooking odors before they come up through and around the items being cooked. This would prevent the flames from searing the meat from below as the fat drops upon the coals which are used in the barbecuing or grilling process. Thus most of the fumes and flames can be drawn off to one side rather than upward through the food being cooked.

Of course, the second flue may be vented separately from that of the main flue since it is not necessary to extend it into the same chimney with the main flue. Generally speaking, for this type of construction the separate flue would extend outwardly and upwardly behind the regular fireplace.

It is therefore a general object of the present invention to provide improved and novel use for fireplaces.

It is still another object of the present invention to provide a barbecue pit in combination with a fireplace.

It is yet another object of this invention to provide a barbecue pit with a flue for controlling cooking when used with a fireplace.

It is still a further object of the present invention to provide a barbecue pit or grill in a fireplace which has means to draw smoke and cooking odors away from the food.

It is yet another object of this invention to provide an open flame grill in a fireplace using a common chamber for collecting the fuel ash and cooking waste.

It is yet another object of this invention to provide a pair of flues in a fireplace having a barbecue pit for controlling the cooking and ventilation processes.

It is yet a further object of this invention to provide a combination fireplace and barbecue pit or grill which can be connected to existing chimneys.

These and other objects and advantages of my invention will more fully appear from the following description, made in connection with the accompanying drawings, wherein like reference characters refer to the same or similar parts throughout the several views, and in which:

FIG. 1 is a diagrammatic view of a fireplace forming a permanent installation in combination with the barbecue and grill; and FIG. 2 shows a portable fireplace and barbecue unit in which the flues are shown in cut-away portion.

A permanent installation of a fireplace 10 is shown in FIG. 1 in which the fireplace is constructed with a front opening 11 and a main flue 12. The front opening is formed by a pair of side walls 7 and 8 and a back wall 9. The main flue extends upwardly near the front of the fireplace and extends into a chimney 13. The upper portion of the fireplace is hidden from view when facing the inner part of the room by the ordinary construction of a wall 14. Situated in the main flue 12 is a damper 15 which is rotatable to close the opening in flue 12 and thereby control the amount of air passing therethrough into chimney 13.

The bottom of the fireplace forms a hearth 16 through which an opening 17 has been formed and into which an upper grate 18 is releasably fitted. A second grate 19 is releasably constructed and arranged in spaced and confronting relation below grate 18 and situated within a chamber 20 which is formed to collect the fuel ash from the coals and also collects the waste from the food being cooked. A door 21 is provided for cleaning chamber 21 through an outwardly extending opening 22. The chamber 20 may be located on the same floor with the fireplace 10 or may be located in the basement where the ash and cooking waste is allowed to drop downwardly into a larger chamber and for this reason, chamber 20 is shown in broken section to indicate that it may take on either form. Situated between grates 18 and 19 and extending outwardly to the rear, is a second or auxiliary flue 23 which is connected to chamber 20 through an opening 24. Flue 23 extends upwardly and communicates with chimney 13. It will be seen that auxiliary flue 23 communicates with chimney 13 at a point which is vertically above damper 15 in the main flue 12. Another damper 25 is located in opening 24 of chamber 20 or within the short horizontal extending portion of auxiliary flue 23 to control the draft and cooking odors and smoke from the food being cooked. In other words, with food such as meat being grilled upon grate 18, where a fire has been built from coals resting on grate 19, a means is provided through the use of dampers 15 and 25 to control the burning of the coals and controlling the excess heat or smoke made by the barbecue or grill while cooking. Thus as explained earlier, as fat drops from the meat onto the coals, the fumes and flames would be drawn to the side through opening 24 where they would be conducted upwardly into chimney 13.

FIG. 2 shows a portable-type unit which may be connected to an existing chimney where main flue 12 and auxiliary flue 23 are enclosed within a common conduit or jacket 26. This conduit or jacket could then be extended into an existing chimney or for some purposes may be used in the manner shown in which the auxiliary flue 23 merely extends upwardly behind the main flue 12. The portable unit is shown with grate 18 removed from opening 17 and placed upon the bottom of the fireplace or hearth 16. Chamber 20 is located below grate 19 and damper 25 is provided with a handle 27. It is, of course, understood that damper 15 may be controlled through any appropriate means and may be done so in the same manner as damper 25 with a handle. With the construction as shown, door 21 may be opened to remove the coals and waste from the cooking process and grates 18 and 19 may be removed for easy cleaning.

In the construction shown in either FIG. 1 or 2, it should be kept in mind that the cooking and fuel burning processes are controlled by the use of dampers 15 and 25 regulating the air flow in flues 12 and 23 respectfully. Thus the ideal situation is obtained by controlling the rate of burning of the fuel and the rate at which the meat or food is cooked.

It will be seen that a barbecue pit or grill has been disclosed which can be used with a fireplace in a new and novel manner where an additional flue or secondary flue is used to control the smoke and fumes from the burning coals while the damper and the main flue may be used to take away the excess heat or smoke which escapes above the food being cooked. It should also be evident that the barbecue apparatus may be made in a portable form when combined with a portable fireplace. By using the novel combination of the chamber, grates, and auxiliary flue with the second damper, new and novel means of combining a grill with a fireplace is obtained.

It will, of course, be understood that various changes may be made in the form, details, arrangement and proportions of the parts without departing from the scope of my invention which consists of the matter shown and described herein and set forth in the appended claims.

What is claimed is:

1. A combined fireplace and barbecue grill comprising:
(a) a fireplace having at least a back wall, a hearth connecting at least said back wall at its lowermost edge, and having an opening therein and a main flue disposed in spaced relation above said hearth with a damper operably disposed therein, the main flue joining at least said back wall at the top thereof;
(b) a chamber having a plurality of openings therein, one of which communicates with said opening in said hearth;
(c) a first grate constructed and arranged to lie over said opening in said hearth for supporting food to be cooked or fuel to be burned;
(d) a second grate constructed and arranged in spaced and confronting relation below said first grate and within said chamber for supporting fuel to be burned;
(e) a second flue extending under said hearth and into one of said plurality of openings in said chamber which is disposed between said first and second grates, for drawing off smoke and cooking odors during cooking of food over said first grate, said flues extending upwardly above said fireplace;
(f) and a damper operably disposed within said second flue for controlling the movement of smoke and cooking odors therethrough.

2. A combined fireplace and barbecue pit comprising:
(a) an open front fireplace having adjoining walls, a hearth with an opening therethrough connecting said walls at their lower most edges and having an opening therein and a main flue with a damper operably disposed therein joining said walls at the top thereof and adapted to be connected into a chimney;
(b) a chamber having a plurality of openings therein, one of which communicates with said opening in said hearth and one of which extends outwardly from the bottom of said chamber;
(c) a first grate constructed and arranged to lie over said opening in said hearth for supporting food to be cooked or fuel to be burned;
(d) a second grate constructed and arranged in spaced and confronting relation below said first grate and within said chamber for supporting fuel to be burned;
(e) a second flue located behind said main flue having its upper end adapted to communicate with said main flue above said damper and having its lower end extending under said hearth and into one of said plurality of openings in said chamber which is disposed between said first and second grates for drawing off smoke and cooking odors during cooking of food over said first grate;
(f) and a door disposed over said opening extending outwardly from the bottom of said chamber to facilitate removal of waste therefrom as a result of burning such fuel and cooking such food supported by said grates.

3. A combined fireplace and barbecue pit comprising:
(a) an open front fireplace having three adjoining walls, a hearth connecting said walls at their lower most edges and having an opening therein and a main flue with a damper operably disposed therein joining said walls at the top thereof and adapted to be connected into a chimney;
(b) a chamber having a plurality of openings therein, one of which communicates with said opening in said hearth and one of which extends outwardly from the bottom of said chamber;
(c) a first grate constructed and arranged to lie over said opening in said hearth for supporting food to be cooked or fuel to be burned;
(d) a second grate constructed and arranged in spaced and confronting relation below said first grate and within said chamber for supporting fuel to be burned;
(e) a second flue having its upper end adapted to be extended into a chimney and having its lower end extending under said hearth and into one of said plurality of openings in said chamber which is disposed between said first and second grates;
(f) a damper operably disposed within said second flue for controlling the movement of fumes and gases therethrough, said damper having a lever for actuation thereof;
(g) and a door disposed over said opening extending outwardly from the bottom of said chamber to facilitate removal of waste therefrom as a result of burning such fuel and cooking such food supported by said grates.

4. A barbecue pit for use with a fireplace having an open front, and a main flue extending into a chimney comprising:
(a) a chamber having a plurality of openings therein, a top opening communicating with such a fireplace through an opening formed in the bottom thereof;
(b) a first grate removably constructed and arranged to lie over said opening formed in the bottom of such a fireplace for supporting food to be cooked or fuel to be burned;
(c) a second grate constructed and arranged in spaced and confronting relation below said first grate and within said chamber for supporting fuel to be burned;

(d) an auxiliary flue having its upper end connected to such a chimney and having its lower end extending under the bottom of such a fireplace and into another of said plurality of openings in said chamber disposed between said first and second grates drawing off smoke and cooking odors during cooking of food over said first grate;

(e) a first damper operably disposed within said auxiliary flue for controlling the movement of said smoke and cooking odors therethrough;

(f) and a second damper operably disposed in such main flue for controlling the movement of gasses through such main flue.

References Cited by the Examiner
UNITED STATES PATENTS

| | | | |
|---|---|---|---|
| 2,409,731 | 10/46 | Bolinger | 126—120 |
| 3,049,113 | 8/62 | Northwood et al. | 126—120 |

FOREIGN PATENTS

| | | |
|---|---|---|
| 4,551 | 1909 | Great Britain. |
| 190,785 | 12/22 | Great Britain. |
| 355,949 | 9/31 | Great Britain. |
| 705,484 | 3/54 | Great Britain. |

JAMES W. WESTHAVER, *Primary Examiner.*